(12) United States Patent
Sugiyama

(10) Patent No.: US 6,917,705 B2
(45) Date of Patent: Jul. 12, 2005

(54) IMAGE PROCESSING APPARATUS AND METHOD, STORAGE MEDIUM AND PROGRAM

(75) Inventor: Miho Sugiyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 624 days.

(21) Appl. No.: 10/101,971

(22) Filed: Mar. 21, 2002

(65) Prior Publication Data

US 2002/0172416 A1 Nov. 21, 2002

(30) Foreign Application Priority Data

Mar. 22, 2001 (JP) ........................................ 2001-083290

(51) Int. Cl.[7] .......................... G06K 9/00; G06F 13/00
(52) U.S. Cl. ..................................... 382/167; 345/604
(58) Field of Search ................................ 382/162, 167, 382/254, 305; 345/600, 601, 604, 690; 348/224.1, 658; 358/1.9, 518, 523, 530

(56) References Cited

U.S. PATENT DOCUMENTS

| | | | | |
|---|---|---|---|---|
| 4,962,418 A | * | 10/1990 | Kamaga | 348/658 |
| 5,837,461 A | * | 11/1998 | Neitz et al. | 435/6 |
| 5,900,860 A | * | 5/1999 | Ueda | 345/600 |
| 5,938,620 A | * | 8/1999 | Daxer | 600/558 |
| 6,160,912 A | * | 12/2000 | Usami | 382/167 |
| 6,340,976 B1 | * | 1/2002 | Oguchi et al. | 345/690 |
| 6,351,320 B1 | * | 2/2002 | Shin | 358/1.9 |
| 6,384,838 B1 | * | 5/2002 | Hannah | 345/601 |
| 6,529,291 B1 | * | 3/2003 | Schweid et al. | 358/1.9 |
| 6,611,613 B1 | * | 8/2003 | Kang et al. | 382/118 |
| 6,652,101 B1 | * | 11/2003 | Glaser | 351/239 |
| 6,674,466 B1 | * | 1/2004 | Takaoka | 348/224.1 |
| 6,717,585 B2 | * | 4/2004 | Kagawa et al. | 345/600 |

* cited by examiner

Primary Examiner—Andrew W. Johns
Assistant Examiner—Amir Alavi
(74) Attorney, Agent, or Firm—Fitzpartick, Cella, Harper & Scinto

(57) ABSTRACT

An image considering the visual field of a visual disorder person is reproduced with high fidelity, and an image matching the visual field of a visual disorder person is corrected to display a clear image, respectively by using visual information conversion correction coefficients. Barriers of visual disorder persons can be reduced. An input image for vision reproduction is corrected by converting values of the XYZ chromaticity coordinates in accordance with the vision characteristics data of the XYZ chromaticity coordinates for a simulated person. A reproduced image with the visual situation of the simulated person is output in accordance with the corrected input image.

34 Claims, 6 Drawing Sheets

(STANDARD COLOR)

20, 30

(ELDERLY PEOPLE VISUAL FIELD COLOR / ELDERLY PEOPLE CORRECTION COLOR)

21, 31

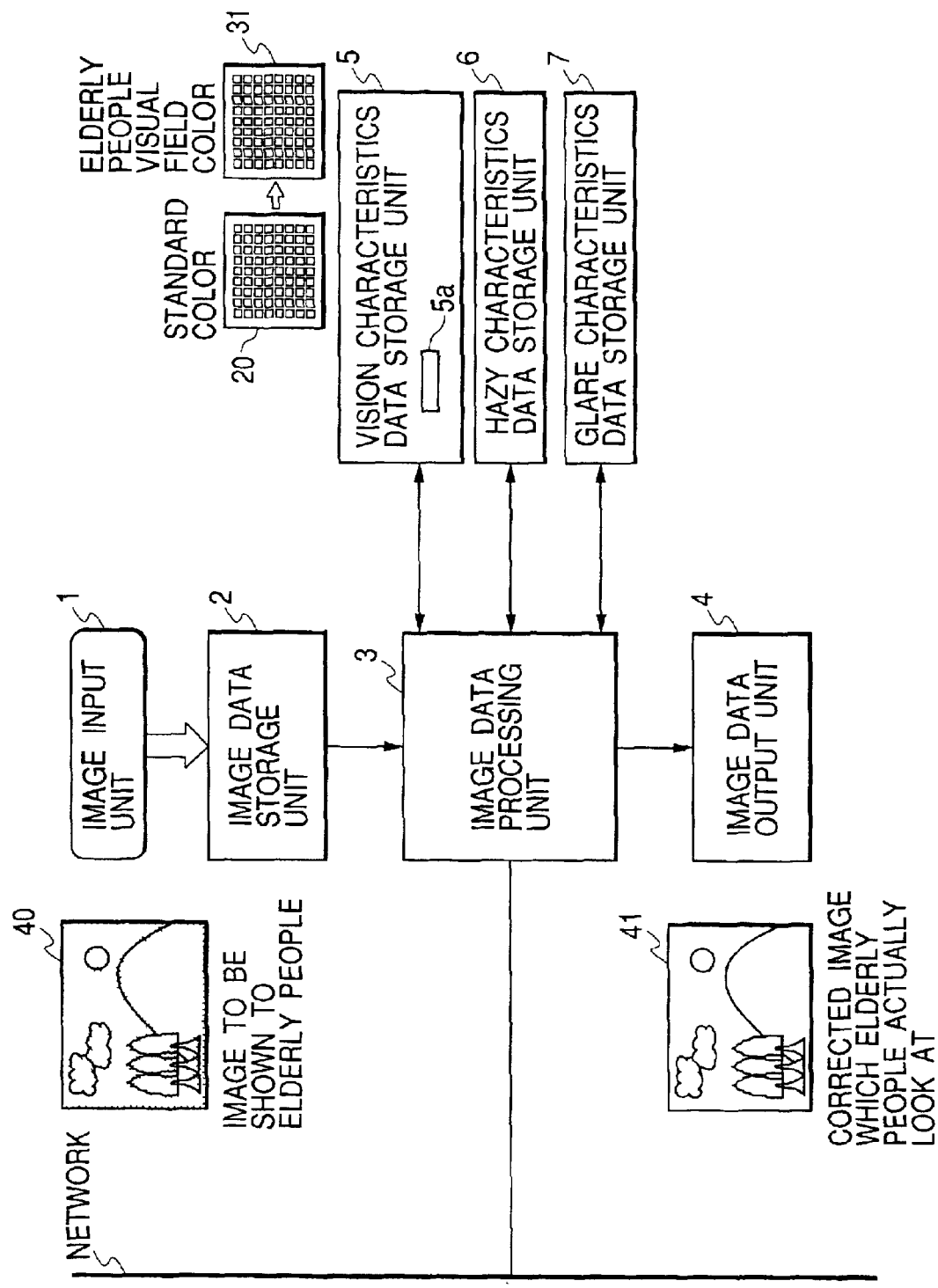

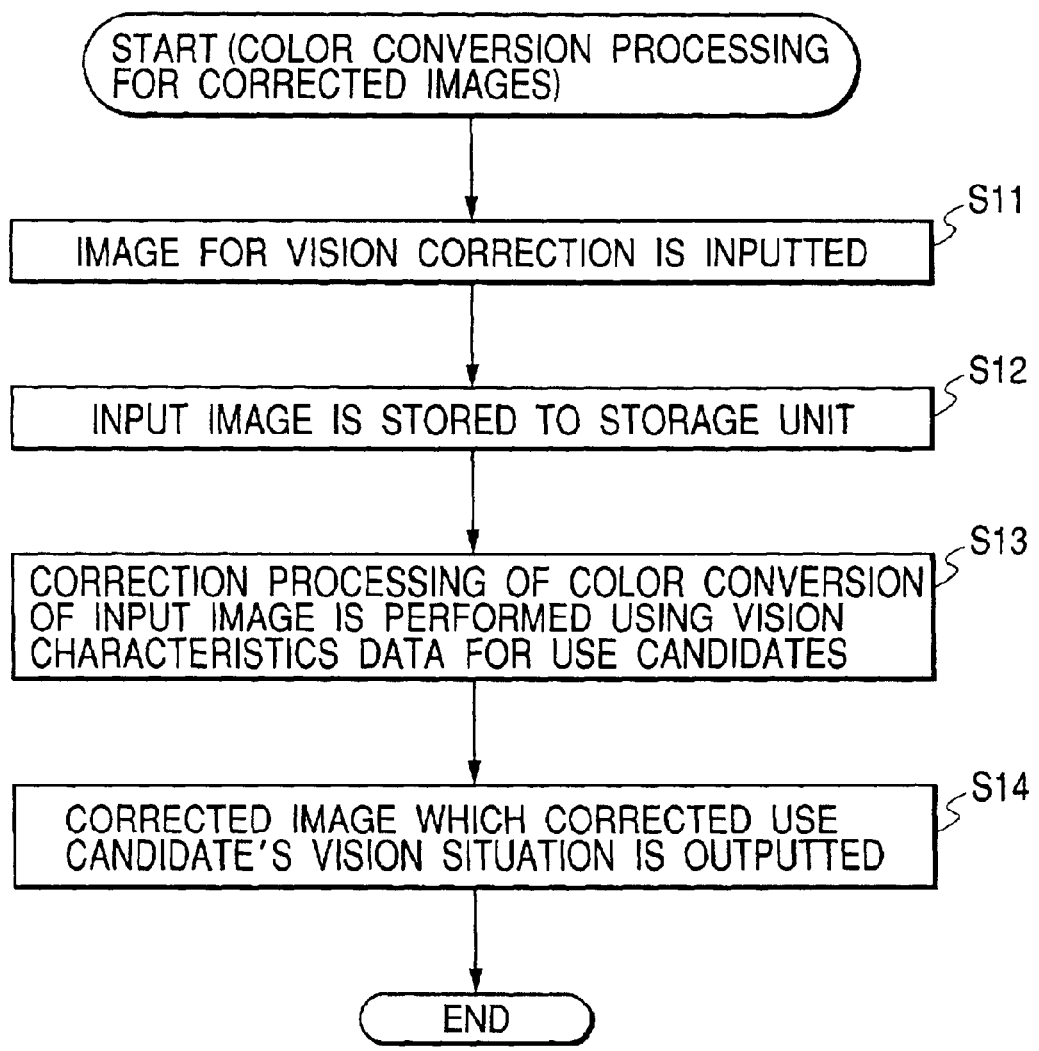

IMAGE PROCESSING APPARATUS AND METHOD, STORAGE MEDIUM AND PROGRAM

BACKGROUND OF THE INVENTION

1. Field of the Invention

The present invention relates to an image processing apparatus and method applicable to a vision simulation apparatus for checking a difference of visions of an object caused by a difference of vision characteristics, a terminal to be used for an elderly person having a changed visual function such as the transmission characteristics of a crystalline lens or a visual disorder person, and the like.

2. Related Background Art

Elderly people are increasing greatly now in Japan, and an elderly people society a quarter of which population is elderly people will come soon. All elderly people will have xanthosis in their crystalline lenses although there is various degrees of xanthosis. Elderly people, a quarter of the population, will have some visual disorder specific to then.

It is generally known that people have xanthosis of the crystalline lens at an advanced age. The vision characteristics of an elderly person continue to change with time, and there is a tendency that the visual field color is different between a youth and an aged healthy person.

A household electric apparatus and a household business machine have been developed on the assumption that they are used not by elderly people but by young healthy people. At the time of design, the vision characteristics of elderly people have not been considered and simulated sufficiently. Elderly people sometimes feel not easy to use these apparatuses.

About 65% of elderly people are working at the age of 65 or older. However, office business machines are designed on the assumption that users have the standard vision characteristics of healthy youth and manhood, hardly considering the use of elderly people. Works by elderly people are therefore hindered.

Elderly people have an increasing chance of using information apparatuses in a lifetime learning room, in a welfare system and the like. General information apparatuses have been developed and manufactured targeting at youth and manhood. There is some problem that elderly people cannot see clearly the display of these information apparatuses.

SUMMARY OF THE INVENTION

It is an object of the invention to provide an image processing apparatus and method capable of reducing barriers of visual disorder people by reproducing an image with high fidelity matching the visual field of each visual disorder person by using correction coefficients for converting visual information.

By forming the conversion characteristics by considering xanthosis of a crystalline lens in an XYZ space, it is possible to correct the vision characteristics of xanthosis of a crystalline lens by using a simple conversion relation.

It is another object of the present invention to provide an image processing apparatus and method capable of reducing barriers of visual disorder people by forming a clear image by correcting an image corresponding to the visual field of each visual disorder person by using correction coefficients for converting visual information.

According to one aspect of the present invention, there is provided an image processing apparatus for vision reproduction, comprising: image storage means for storing an input image to be used for the vision reproduction; vision characteristics data storage means for storing vision characteristics data of XYZ chromaticity coordinates for a simulated person; color converting means for performing conversion of values of the XYZ chromaticity coordinates in accordance with the vision characteristics data and correcting the input image; and means for outputting a reproduced image reproducing a visual situation of the simulated person in accordance with the corrected input image.

According to another aspect of the invention, there is provided an image processing apparatus for vision correction, comprising: image storage means for storing an input image to be used for the vision correction; vision characteristics data storage means for storing vision characteristics data of XYZ chromaticity coordinates for a user; color converting means for performing conversion of values of the XYZ chromaticity coordinates in accordance with the vision characteristics data and correcting the input image; and means for outputting a corrected image compensating the visual situation of the user in accordance with the corrected input image.

According to another aspect of the invention, there is provided an image processing method for vision reproduction, comprising the steps of: inputting an image to be used for the vision reproduction; performing conversion of values of XYZ chromaticity coordinates in accordance with vision characteristics data of the XYZ chromaticity coordinates for a simulated person and correcting the input image; and outputting a reproduced image reproducing a visual situation of the simulated person in accordance with the corrected input image.

According to another aspect of the invention, there is provided an image processing method for vision correction, comprising the steps of: inputting an image to be used for the vision correction; performing conversion of values of XYZ chromaticity coordinates in accordance with vision characteristics data of XYZ chromaticity coordinates for a user and correcting the input image; and outputting a corrected image compensating a visual situation of the user in accordance with the corrected input image.

According to another aspect of the invention, there is provided a medium storing an image processing control program for making a computer execute an image processing control for vision reproduction, wherein: the image processing control program makes the computer input an image to be used for the vision reproduction; the image processing control program makes the computer perform conversion of values of XYZ chromaticity coordinates in accordance with vision characteristics data of the XYZ chromaticity coordinates for a simulated person and correct the input image; and the image processing control program making the computer output a reproduced image reproducing a visual situation of the simulated person in accordance with the corrected input image.

According to another aspect of the invention, there is provided a medium storing an image processing control program for making a computer execute an image processing control for vision correction, wherein: the image processing control program makes the computer input an image to be used for the vision correction; the image processing control program makes the computer perform conversion of values of XYZ chromaticity coordinates in accordance with vision characteristics data of the XYZ chromaticity coordinates for a user and correct the input image; and the image processing control program making the computer output a corrected image compensating a visual situation of the user in accordance with the corrected input image.

According to another aspect of the invention, there is provided an image processing control program stored in a computer readable storage medium for performing an image processing control for vision reproduction, the program comprising the steps of: inputting an image to be used for the vision reproduction; performing conversion of values of XYZ chromaticity coordinates in accordance with vision characteristics data of the XYZ chromaticity coordinates for a simulated person and correcting the input image; and outputting a reproduced image reproducing a visual situation of the simulated person in accordance with the corrected input image.

According to another aspect of the invention, there is provided an image processing control program stored in a computer readable storage medium for performing an image processing control for vision correction, the program comprising the steps of: inputting an image to be used for the vision correction; performing conversion of values of XYZ chromaticity coordinates in accordance with vision characteristics data of the XYZ chromaticity coordinates for a user and correcting the input image; and outputting a corrected image compensating a visual situation of the user in accordance with the corrected input image.

The vision characteristics data stored in the vision characteristics data storage means may be a proportional coefficient for each of values of the XYZ chromaticity coordinates, a value of the proportional coefficient having a predetermined relation to a vision of a healthy youth.

The value of the proportional coefficient may be 1.00 to 2.25 times for X, 1.00 to 2.17 for Y and 1.00 to 2.41 times for Z, where X=1.026±0.151 and Z=1.130±0.074 at Y=1.

The vision characteristics data stored in the vision characteristics data storage means may be stored in a color table storing predetermined display colors and a color table storing display colors matching the visual situation of the simulated person.

The simulated person may be an elderly person having xanthosis of a crystalline lens caused by ages, and the visual situation of the elderly person is reproduced.

BRIEF DESCRIPTION OF THE DRAWINGS

FIG. 6 is a block diagram showing the structure of a system for correcting an image according to a second embodiment of the invention.

FIG. 7 is a flow chart illustrating a color conversion process of correcting an image.

DETAILED DESCRIPTION OF THE PREFERRED EMBODIMENTS

Figure 1:
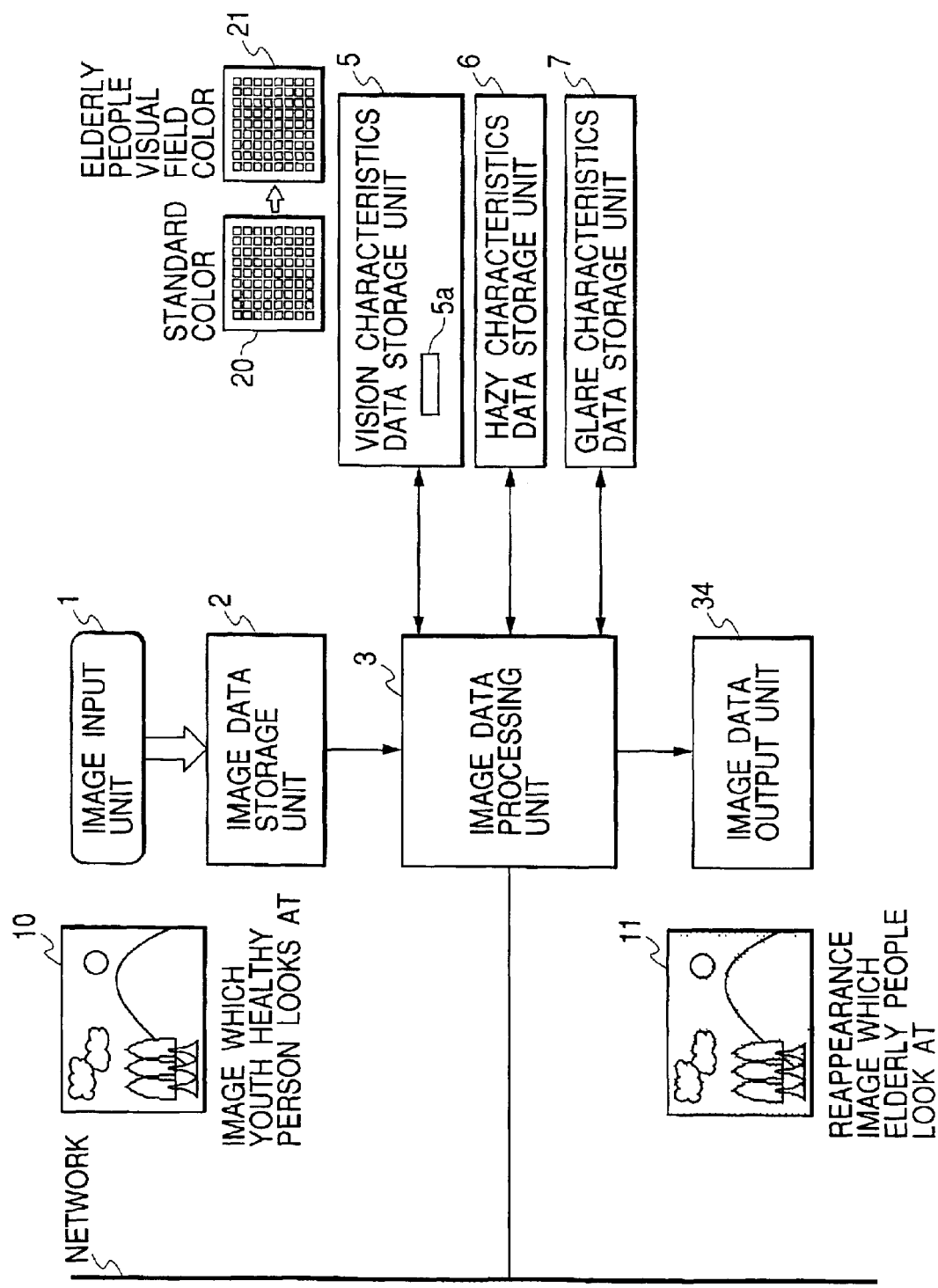
FIG. 1 is a block diagram showing the structure of a system for reproduction an image according to a first embodiment of the invention.

Embodiments of the invention will be described with reference to the accompanying drawings.

First Embodiment

The first embodiment of the invention will be described with reference to FIGS. 1 to 6.

In this embodiment, even industrial and electric designers who don't know the visual situation of an elderly person can properly set colorings (particularly colorings of displays such as characters and marks) of products which colorings are distinguishable even with the vision characteristics of elderly people.

An image simulating apparatus for reproducing an image matching the vision characteristics will be described by way of example. This apparatus is used when industrial and electric designers design a product usable by both an elderly person and a visually healthy person.

(System Structure)

This apparatus has an image input unit 1 for inputting an image, an image data storage unit 2 for temporarily storing an input image, an image data processing unit 3, an image data output unit 4 for displaying or printing processed image data, a vision characteristics data storage unit 5 for storing vision characteristics data 5a to be used for simulation, a hazy characteristics data storage unit 6 and a glare characteristics data storage unit 7. The image data processing unit 3 includes a CPU, a ROM for storing various programs such as control programs of the invention, a RAM to be used for various calculations, and other components. The image data processing unit 3 executes a color conversion process for an input image by using vision characteristics data 5a stored in color conversion tables 20 and 21 (refer to FIGS. 5A and 5B to be described later) to be used for simulation. Various inputs by a user can be made by using an unrepresented keyboard or pointing device such as a mouse of the embodiment system.

(System Operation)

Figure 2:
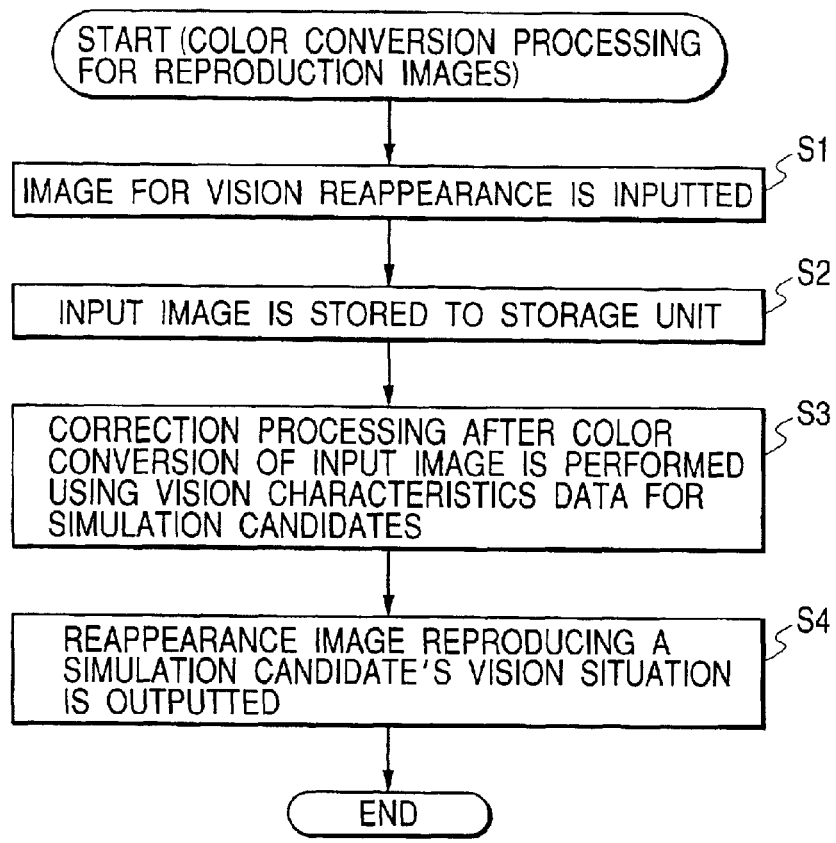
FIG. 2 is a flow chart illustrating a color conversion process of reproducing an image.

The operation of the apparatus will be described with reference to the flow chart shown in FIG. 2.

At Step S1 an image (an image 10 which a healthy youth looks at) for vision reproduction is input to the image input unit 1.

At Step S2 the image 10 input to the image input unit 1 is temporarily stored in the image data storage unit 2.

At Step S3 the image data processing unit 3 performs image processing, i.e., a color conversion process for the input image 10 by using vision data of a simulated person designated beforehand, the vision data being read from the vision characteristics data 5a stored in the vision characteristics data storage unit 5.

At Step S4 the image data output unit 4 outputs as the image processing results a reproduced image (an image 11 seen by an elderly person) matching the visual situation of the simulated person.

(Reproduction Process: Simulation)

Next, the process of reproducing the visual field of an elderly person will be described.

Generally, a change in the vision of an elderly person includes:

1) a change in hue/brightness of a visual field to be caused by xanthosis of a crystalline lens of an eye;

2) hazy to be caused by a lowered focus adjusting power; and 3) glare to be caused by opacity of a crystalline lens.

In this embodiment, attention is paid particularly to "1) a change in hue/brightness of a visual field to be caused by xanthosis of a crystalline lens of an eye". Although the other changes will not be described in detail, the changes "2) hazy to be caused by a lowered focus adjusting power" and "3) glare to be caused by opacity of a crystalline lens" can be reduced by edge emphasis, increased contrast and the like.

Description will be made for a specific operation to be performed by the image data processing unit 3 by using the vision characteristics data 5*a* stored in the vision characteristics data storage unit 5 in order to reduce "a change in hue/brightness of a visual field to be caused by xanthosis of a crystalline lens of an eye".

Figure 3:
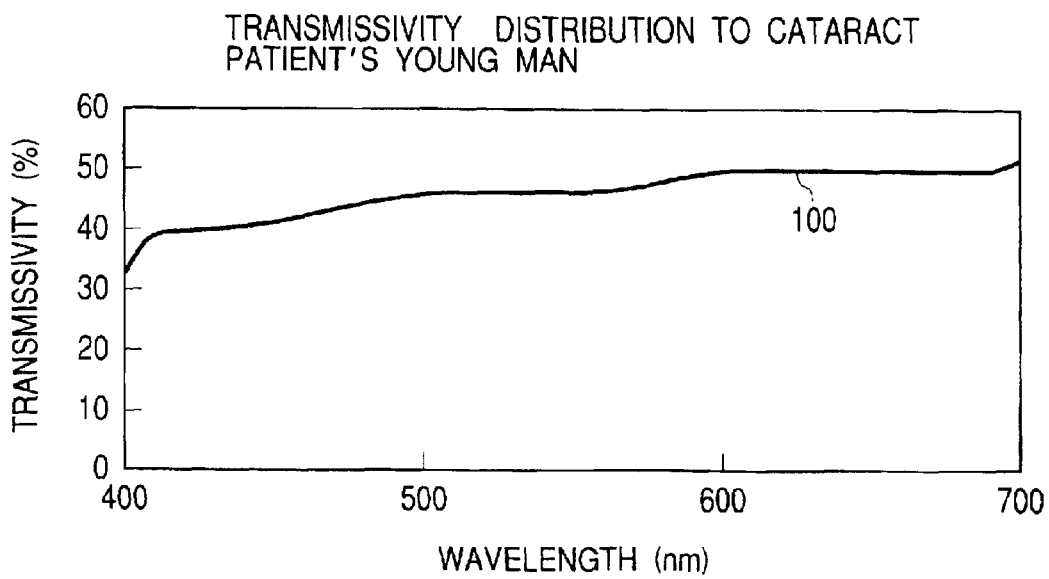
FIG. 3 is a vision characteristics graph (spectrum distribution of a filter for forming an elderly person visual field) showing the transmissivity distribution of an elderly person relative to a youth.

FIG. 3 is a vision characteristics graph showing a transmissivity distribution 100 of an elderly person (cataract disorder patient) relative to a healthy youth.

As seen from the transmissivity distribution 100 shown in this vision characteristics graph, as compared to a healthy youth, an elderly person has a dark visual field (brightness is about a half) and a lowered transmissivity of the crystalline lens in the visual range on the side of shorter wavelength (particularly blue range). The visual field of an elderly person is reproduced through simulation on the assumption that the visual field of an elderly person generally has a dark visual field and is yellowish as seen from the transmissivity distribution 100.

(Correction Coefficients)

Color has generally various specific spectrum distributions. This spectrum distribution can be represented by values of the XYZ color specification by making the following calculations:

$$x = \frac{\int S(\lambda)\bar{x}(\lambda)d\lambda}{\int S(\lambda)\bar{S}(\lambda)d\lambda} \quad (1)$$

$$y = \frac{\int S(\lambda)\bar{y}(\lambda)d\lambda}{\int S(\lambda)\bar{S}(\lambda)dS} \quad (2)$$

$$Y = \frac{100\int S(\lambda)\bar{y}(\lambda)dy}{\int S(\lambda)\bar{y}(\lambda)dy} \quad (3)$$

where S(λ) is a relative spectrum distribution of illumination light.

$\bar{x}(\lambda), \bar{y}(\lambda), \bar{z}(\lambda)$: color matching functions specific to colors.

$\bar{S}(\lambda) = \bar{x}(\lambda) + \bar{y}(\lambda) + \bar{z}(\lambda)$ where the wavelength range is a visual range (e.g., 380 nm to 780 nm).

$$x = \frac{X}{X+Y+Z} \quad (4)$$

$$y = \frac{Y}{X+Y+Z} \quad (5)$$

$$z = \frac{Z}{X+Y+Z} = 1 - x - y \quad (6)$$

With these calculations, the spectrum distribution can be converted into XYZ values.

In order to reproduce the visual field from the above equations (1) to (6), the vision characteristics data storage unit 5 stores proportional coefficients for respective XYZ values relative to the vision of a healthy youth. The proportional coefficients are 1.00 to 2.25 times for X, 1.00 to 2.17 for Y and 1.00 to 2.41 times for Z, where X=1.026±0.151 and Z=1.130±0.074 at Y=1. These proportional coefficients are used when the image data processing unit 3 performs a color conversion process.

Specific examples of the proportional coefficients will be described.

Figure 4A:
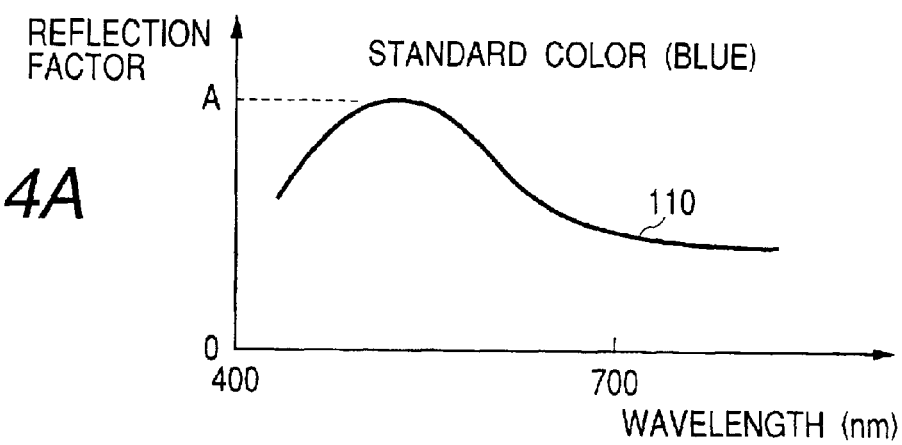
FIGS. 4A, 4B and 4C are diagrams illustrating a process of calculating proportional coefficients.
Figure 4B:
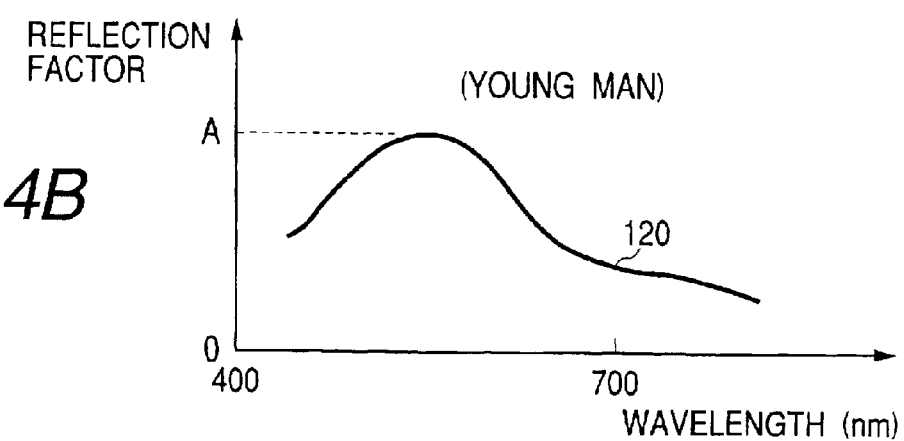
Figure 4C:
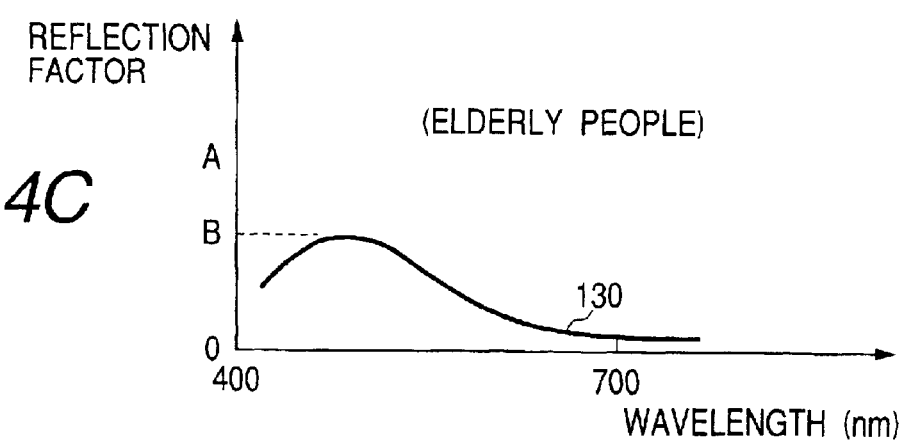

FIG. 4A shows a spectrum distribution 110 of a standard color (e.g., blue). FIG. 4B shows a spectrum distribution 120 expressing how a healthy youth sees the blue color shown in FIG. 4A. FIG. 4C shows a spectrum distribution 130 expressing how an elderly person sees the blue color shown in FIG. 4A.

A healthy youth sees the blue color in the same manner as the spectrum distribution 110 of the standard blue color. An elderly person sees the blue color with a slightly lowered reflectivity and a changed distribution shape.

The spectrum distribution 120 of the healthy youth shown in FIG. 4B is converted into the XYZ color specification values as in the following:

$$X(\text{youth}) = 9.38 \quad (7)$$

$$Y(\text{youth}) = 14.78 \quad (8)$$

$$Z(\text{youth}) = 21.17 \quad (9)$$

The spectrum distribution 130 of the elderly person shown in FIG. 4C is converted into the XYZ color specification values as in the following:

$$X(\text{elderly}) = 4.58 \quad (10)$$

$$Y(\text{elderly}) = 7.58 \quad (11)$$

$$Z(\text{elderly}) = 9.76 \quad (12)$$

From the equations (7) to (12), the following relations are established:

$$X(\text{youth})/X(\text{elderly}) = 2.05 = Kx \quad (13)$$

$$Y(\text{youth})/Y(\text{elderly}) = 1.95 = Ky \quad (14)$$

$$Z(\text{youth})/Z(\text{elderly}) = 2.17 = Kz \quad (15)$$

The values of the equations (13) to (15) are used as the proportional coefficients. This proportional relations are the same for other colors.

In this embodiment, in reproducing the visual field of an elderly person, the spectrum distribution 130 of an elderly person is multiplied by the transmissivity distribution 100 shown in FIG. 3:

(XYZ value of color of input image (healthy youth))/(Kx) or (Ky) or (Kz)     (16)

In this manner, the visual field/darkness of an elderly person can be easily reproduced. The numeral range is set so that each degree of xanthosis of a crystalline lens of an elderly person can be dealt with.

By using the relations of proportional coefficients, color can be reproduced matching the dark visual field and xanthosis gradually changing with the age of a crystalline lens. In this embodiment, the vision spectrum characteristics of a healthy youth and an elderly person are related to the XYZ chromaticity coordinate system so that simple calculations using the proportional coefficients are possible.

As a specific example of reproducing color through color conversion by the image data processing unit 3, pairs of a predetermined display color and a display color in the visual situation of a simulated person may be stored as color samples in a table.

Figure 5A:
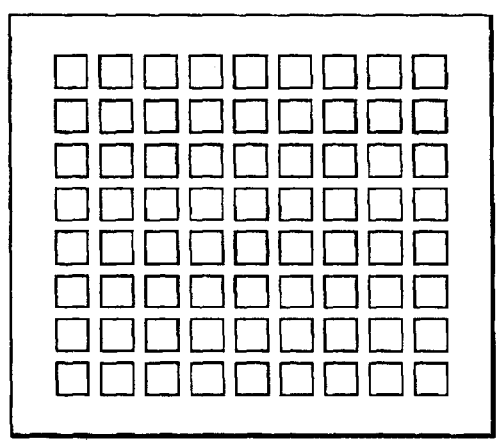
FIGS. 5A and 5B are illustrative diagrams showing examples of a color conversion table.
Figure 5B:
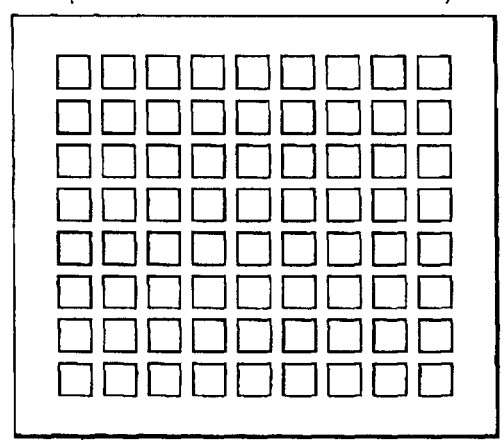

FIGS. 5A and 5B show examples of color conversion tables.

A color conversion table 20 shown in FIG. 5A stores predetermined standard colors of 256 colors, 1024 colors or the like. A color conversion table 21 shown in FIG. 5B stores corresponding visual field colors of an elderly person. Instead of using the tables, the above-described color conversion calculations may be performed for each color.

Instead of using the XYZ color specification for the color conversion tables 20 and 21, the tables may store coordinate values or their modified values of other color spaces such as L*a*b*, xyY, and L*u*v*.

Instead of using the color conversion tables, the apparatus may be structured so that if a predetermined color is designated, a corresponding converted color can be identified.

The light source environment for simulation is selected from standard light sources (A light source, C light source, D65 light source and the like) stipulated in JIS. The standard light source D65 may be selected which has a small hue change. If other light sources are to be used, a color conversion table for each light source is prepared and selectively used in accordance with the light source to be used. In this manner, proper color conversion becomes possible.

A process of reproducing the vision characteristics for a simulated person may be selected when necessary, or may be used continuously after it is once selected.

An image may be picked up by an image scanner or a digital camera. An image formed by another terminal may be used, or the image formed in this embodiment may be used.

As described above, color can be reproduced with high fidelity like a filter by using the spectrum transmissivity distribution of an elderly person at about 70 years old relative to a healthy youth. Accordingly, even industrial and electric designers who don't know the visual situation of an elderly person can properly set colorings (particularly colorings of displays such as characters and marks) of products which colorings are distinguishable even with the vision characteristics of elderly people.

With this reproduction process, an image simulation apparatus and method for reproducing the vision characteristics can be realized. This apparatus and method is used when industrial and electric designers design a product usable by both an elderly person and a visually healthy person.

Second Embodiment

Next, the second embodiment will be described with reference to FIGS. 6 and 7. In FIGS. 6 and 7, like elements to those of the first embodiment are represented by identical reference numerals and the description thereof is omitted.

In this embodiment, an image is corrected to be distinguishable even by an elderly person by considering the vision characteristics of the elderly person.

In this embodiment, a display apparatus for an elderly person will be described by way of example, the apparatus being able to easily display an image compensating the visual situation of a user in response to an instruction from the user.

(System Structure)

FIG. 6 shows the outline structure of an image processing apparatus applicable to the invention.

The fundamental structure of this apparatus is the same as that shown in FIG. 1. The vision characteristics data storage unit 5 stores vision characteristics data 5a for each user. The image data processing unit 3 performs the color conversion process for an input image by using the vision characteristics data 5a.

(System Operation)

The operation of the apparatus will be described with reference to the flow chart shown in FIG. 7.

At Step S11 an image (an image 40 seen by an elderly person) for vision correction is input to the image input unit 1.

At Step S12 the image 10 input to the image input unit 1 is temporarily stored in the image data storage unit 2.

At Step S13 the image data processing unit 3 performs image processing, i.e., a color conversion process for the input image 10 by using vision data for the user designated beforehand, the vision data being read from the vision characteristics data 5a stored in the vision characteristics data storage unit 5.

At Step S14 the image data output unit 4 outputs as the image processing results a corrected image (an image 41 which the user can look at) compensating the visual situation of the user.

(Correction Process)

Next, a process of correcting an image through color conversion so as to match the visual situation of an elderly person will be described.

Also in this embodiment, of the changes 1) to 3) described earlier, attention is paid particularly to "1) a change in hue/brightness of a visual field to be caused by xanthosis of a crystalline lens of an eye". Although the other changes 2) and 3) will not be described in detail, the changes can be reduced by edge emphasis, raised contrast and the like.

Description will be made for a specific operation to be performed by the image data processing unit 3 by using the vision characteristics data 5a stored in the vision characteristics data storage unit 5 in order to reduce "a change in hue/brightness of a visual field to be caused by xanthosis of a crystalline lens of an eye". The color conversion using the proportional coefficients are performed by using the equations (1) to (15) of the first embodiment, and the detailed description thereof is omitted.

Also in the second embodiment, the visual situation of an elderly person is compensated in accordance with the transmissivity distribution 100 of an elderly person relative to a healthy youth shown in the vision characteristics graph of FIG. 3.

In order to compensate for the visual field of an elderly person from the equations (1) to (6) described earlier, the vision characteristics data storage unit 5 stores proportional coefficients for respective XYZ values relative to the vision of a healthy youth. The proportional coefficients are 1.00 to 2.25 times for X, 1.00 to 2.17 for Y and 1.00 to 2.41 times for Z, where X=1.018±0.147 and Z=0.893±0.058 at Y=1. These proportional coefficients are used when the image data processing unit 3 performs a color conversion process.

The values of the equations (13) to (15) described earlier are used as the proportional coefficients. This proportional relations are the same for other colors.

In this embodiment, in compensating for the visual field of an elderly person, the spectrum distribution 130 of an elderly person is multiplied by the transmissivity distribution 100 shown in FIG. 3:

$$\text{(XYZ value of color of input image (elderly person))}/(K_x) \text{ or } (K_y) \text{ or } (K_z) \quad (17)$$

In this manner, the visual field/darkness of an elderly person can be easily compensated. The numeral range is set so that each degree of xanthosis of a crystalline lens of an elderly person can be dealt with.

By using the relations between proportional coefficients, color can be corrected so as compensate the xanthosis gradually changing with the age of a crystalline lens.

As a specific example of correcting color through color conversion by the image data processing unit 3, pairs of a predetermined display color and a display color in the visual situation of a simulated person may be stored as color samples in a table.

As described with reference to FIGS. 5A and 5B, a color conversion table 30 shown in FIG. 5A stores predetermined standard colors of 256 colors, 1024 colors or the like. A color conversion table 31 shown in FIG. 5B stores corresponding visual field colors of an elderly person. Instead of using the tables, the above-described color conversion calculations may be performed for each color.

Instead of using the XYZ color specification for the color conversion tables 30 and 31, the tables may store coordinate values or their modified values of other color spaces such as L*a*b*, xyY, and L*u*v*.

Instead of using the color conversion tables, the apparatus may be structured so that if a predetermined color is designated, a corresponding converted color can be identified.

The light source environment for simulation is selected from standard light sources (A light source, C light source, D65 light source and the like) stipulated in JIS. The standard light source D65 may be selected which has a small hue change.

A process of compensating the vision characteristics for a user may be selected when necessary, or may be used continuously after it is once selected.

As described above, color can be corrected with high fidelity like a filter by using the spectrum transmissivity distribution of an elderly person at about 70 years old relative to a healthy youth. Accordingly, a display apparatus for an elderly person capable of displaying an image with the corrected vision characteristics of an elderly person can be manufactured, and a display apparatus for an elderly person capable of easily displaying an image compensating the visual situation of a user can be manufactured. It may occur that simulation correctly reflecting xanthosis of the crystalline lens of a user cannot be obtained by an instruction of the user. To avoid this, the system shown in FIGS. 1 and 6 may access via a network an unrepresented medical facility server or a PC in the user home which stores physical information of the user. In accordance with the received xanthosis information of the user crystalline lens, the image data processing unit 3 dynamically forms a color conversion table to perform the above-described simulation.

The invention is also applicable to a system having a plurality of apparatuses (e.g., a host computer, an interface apparatus, a reader, a printer and the like) or to a single apparatus (e.g., a compact image processing apparatus such as a personal digital assistants PDA) apparatus, a copier, a facsimile or the like).

It is needless to say that the invention can be embodied by supplying the system or apparatus with programs. The effects of the invention can also be obtained by supplying the system or apparatus with a storage medium storing software programs realizing the invention and making a computer (or CPU or MPU) of the system or apparatus read and execute program codes stored in the storage medium.

In this case, the software program codes themselves read from the storage medium realize the embodiment function. Therefore, the storage medium storing the program codes constitute the present invention.

The storage medium for storing such program codes may be a floppy disk, a hard disk, an optical disk, a magneto optical disk, a CD-ROM, a CD-R, a magnetic tape, a nonvolatile memory card (IC memory card), a ROM (mask ROM, flash EEPROM, etc.) or the like.

It is obvious that not only the computer executes the read program codes to realize the embodiment function but also an OS (operating system) running on the computer realizes the embodiment function by executing the whole or a portion of actual processes in accordance with the program codes.

It is obvious that the scope of the invention also contains the case wherein the functions of each embodiment can be realized by writing the program codes read from the storage medium into a memory of a function expansion board inserted into a computer or of a function expansion unit connected to the computer, and thereafter by making a CPU of the function expansion board or function expansion unit execute a portion or the whole of actual processes.

As described so far, according to the invention, an input image for vision reproduction is corrected by converting values of the XYZ chromaticity coordinates in accordance with the vision characteristics data of the XYZ chromaticity coordinates for a simulated person. A reproduced image with the visual situation of the simulated person is output in accordance with the corrected input image. Accordingly, it is possible to reproduce color matching the spectrum transmissivity distribution of a crystalline lens of an elderly person, to reproduce the vision characteristics of an elderly person with high fidelity, and to develop a product usable by elderly people, youths and manhood.

According to the invention, an input image for vision correction is corrected by converting values of the XYZ chromaticity coordinates in accordance with the vision characteristics data of the XYZ chromaticity coordinates for a user. A reproduced image with the corrected vision characteristics of the user is output in accordance with the corrected input image. Accordingly, it is possible to reproduce and display an image compensating the vision characteristics of an elderly person and to allow a user with visual disorder specific to elderly people to use an information apparatus with clear images.

It is therefore possible to prevail products properly usable by both young healthy persons and elderly persons and information apparatuses capable of displaying clear images even for elderly persons. The same product can be used by young persons, manhood and elderly persons without any barriers. Elderly persons can positively participate in works, lifetime learning and hobbies to enrich their lives.

What is claimed is:

1. An image processing apparatus for vision reproduction, comprising:

image storage means for storing an input image to be used for the vision reproduction;

vision characteristics data storage means for storing vision characteristics data of XYZ chromaticity coordinates for a simulated person;

color converting means for performing conversion of values of the XYZ chromaticity coordinates in accordance with the vision characteristics data and correcting the input image; and means for outputting an image reproducing a visual situation of the simulated person in accordance with the corrected image.

2. An image processing apparatus according to claim 1, wherein the vision characteristics data stored in said vision characteristics data storage means is a proportional coefficient for each of values of the XYZ chromaticity coordinates, and wherein a value of the proportional coefficient has a predetermined relation to a vision of a healthy youth.

3. An image processing apparatus according to claim 2, wherein the value of the proportional coefficient is 1.00 to 2.25 times for X, 1.00 to 2.17 for Y and 1.00 to 2.41 times for Z, where X=1.026±0.151 and Z=1.130±0.074 at Y=1.

4. An image processing apparatus according to claim 1, wherein the vision characteristics data stored in said vision characteristics data storage means is composed of a color table indicating predetermined display colors and a color table indicating display colors matching the visual situation of the simulated person.

5. An image processing apparatus according to any one of claims 1 to 4, wherein the simulated person is an elderly person having xanthosis of a crystalline lens caused by ages, and the visual situation of the elderly person is reproduced.

6. An image processing apparatus for vision correction, comprising:
   image storage means for storing an input image to be used for the vision correction;
   vision characteristics data storage means for storing vision characteristics data of XYZ chromaticity coordinates for a user;
   color converting means for performing conversion of values of the XYZ chromaticity coordinates in accordance with the vision characteristics data and correcting the input image; and
   means for outputting a corrected image compensating the visual situation of the user in accordance with the corrected input image.

7. An image processing apparatus according to claim 6, wherein the vision characteristics data stored in said vision characteristics data storage means is a proportional coefficient for each of values of the XYZ chromaticity coordinates, and wherein a value of the proportional coefficient has a predetermined relation to a vision of a healthy youth.

8. An image processing apparatus according to claim 7, wherein the value of the proportional coefficient is 1.00 to 2.25 times for X, 1.00 to 2.17 for Y and 1.00 to 2.41 times for Z, where X=1.018±0.147 and Z=0.893±0.058 at Y=1.

9. An image processing apparatus according to claim 6, wherein the vision characteristics data stored in said vision characteristics data storage means is composed of a color table indicating predetermined display colors and a color table indicating display colors compensating the visual situation of the user.

10. An image processing apparatus according to any one of claims 6 to 9, wherein the user is an elderly person having xanthosis of a crystalline lens caused by ages, and the visual situation of the elderly person is corrected.

11. An image processing apparatus according to any one of claims 6 to 9, wherein a visual disorder person uses the apparatus through correction by the visual situation and a healthy youth without visual disorder also uses the apparatus.

12. An image processing method for vision reproduction, comprising the steps of:
   inputting an image to be used for the vision reproduction;
   performing conversion of values of XYZ chromaticity coordinates in accordance with vision characteristics data of the XYZ chromaticity coordinates for a simulated person and correcting the input image; and
   outputting an image reproducing a visual situation of the simulated person in accordance with the corrected image.

13. An image processing method according to claim 12, wherein the vision characteristics data is a proportional coefficient for each of values of the XYZ chromaticity coordinates, and wherein a value of the proportional coefficient has a predetermined relation to a vision of a healthy youth.

14. An image processing method according to claim 13, wherein the value of the proportional coefficient is 1.00 to 2.25 times for X, 1.00 to 2.17 for Y and 1.00 to 2.41 times for Z, where X=1.026±0.151 and Z=1.130±0.074 at Y=1.

15. An image processing method according to claim 12, wherein the vision characteristics data is composed of a color table indicating predetermined display colors and a color table indicating display colors matching the visual situation of the simulated person.

16. An image processing method according to any one of claims 12 to 15, wherein the simulated person is an elderly person having xanthosis of a crystalline lens caused by ages, and the visual situation of the elderly person is reproduced.

17. An image processing method for vision correction, comprising the steps of:
   inputting an image to be used for the vision correction;
   performing conversion of values of XYZ chromaticity coordinates in accordance with vision characteristics data of XYZ chromaticity coordinates for a user and correcting the input image; and
   outputting a corrected image compensating a visual situation of the user in accordance with the corrected input image.

18. An image processing method according to claim 17, wherein the vision characteristics data is a proportional coefficient for each of values of the XYZ chromaticity coordinates, and wherein a value of the proportional coefficient has a predetermined relation to a vision of a healthy youth.

19. An image processing method according to claim 18, wherein the value of the proportional coefficient is 1.00 to 2.25 times for X, 1.00 to 2.17 for Y and 1.00 to 2.41 times for Z, where X=1.018±0.147 and Z=0.893±0.058 at Y=1.

20. An image processing method according to claim 17, wherein the vision characteristics data stored is composed of a color table indicating predetermined display colors and a color table indicating display colors compensating the visual situation of the user.

21. An image processing method according to any one of claims 17 to 20, wherein the user is an elderly person having xanthosis of a crystalline lens caused by ages, and the visual situation of the elderly person is corrected.

22. An image processing apparatus according to claim 17, wherein a visual disorder person uses the apparatus through correction by the visual situation and a healthy youth without visual disorder also uses the apparatus.

23. A computer-readable medium storing an image processing control program for making a computer execute an image processing control for vision reproduction, wherein:
   the image processing control program makes the computer input an image to be used for the vision reproduction;
   the image processing control program makes the computer perform conversion of values of XYZ chromaticity coordinates in accordance with vision characteristics data of the XYZ chromaticity coordinates for a simulated person and correct the input image; and
   the image processing control program making the computer output an image reproducing a visual situation of the simulated person in accordance with the corrected image.

24. A medium according to claim 23, wherein the vision characteristics data is a proportional coefficient for each of values of XYZ chromaticity coordinates, and wherein a value of the proportional coefficient has a predetermined relation to a vision of a healthy youth, and wherein a value of the proportional coefficient is 1.00 to 2.25 times for X, 1.00 to 2.17 for Y and 1.00 to 2.41 times for Z, where $X=1.026\pm0.151$ and $Z=1.130\pm0.074$ at $Y=1$.

25. A medium according to claim 23, wherein the vision characteristics data is stored in a color table storing predetermined display colors and a color table storing display colors matching the visual situation of the simulated person.

26. A computer-readable medium storing an image processing control program for making a computer execute an image processing control for vision correction, wherein:

the image processing control program makes the computer input an image to be used for the vision correction;

the image processing control program makes the computer perform conversion of values of XYZ chromaticity coordinates in accordance with vision characteristics data of the XYZ chromaticity coordinates for a user and correct the input image; and the image processing control program making the computer output a corrected image compensating a visual situation of the user in accordance with the corrected input image.

27. A medium according to claim 26, wherein the vision characteristics data is a proportional coefficient for each of values of XYZ chromaticity coordinates, and wherein a value of the proportional coefficient has a predetermined relation to a vision of a healthy youth, and wherein the value of the proportional coefficient is 1.00 to 2.25 times for X, 1.00 to 2.17 for Y and 1.00 to 2.41 times for Z, where $X=1.018\pm0.147$ and $Z=0.893\pm0.058$ at $Y=1$.

28. A medium according to claim 26, wherein the vision characteristics data stored is stored in a color table storing predetermined display colors and a color table storing display colors compensating the visual situation of the user.

29. An image processing control program stored in a computer readable storage medium for performing an image processing control for vision reproduction, the program comprising the steps of:

inputting an image to be used for the vision reproduction;

performing conversion of values of XYZ chromaticity coordinates in accordance with vision characteristics data of the XYZ chromaticity coordinates for a simulated person and correcting the input image; and outputting an image reproducing a visual situation of the simulated person in accordance with the corrected image.

30. An image processing control program according to claim 29, wherein the vision characteristics data is a proportional coefficient for each of values of XYZ chromaticity values, and wherein a value of the proportional coefficient having a predetermined relation to a vision of a healthy youth, and wherein a value of the proportional coefficient is 1.00 to 2.25 times for X, 1.00 to 2.17 for Y and 1.00 to 2.41 times for Z, where $X=1.026\pm0.151$ and $Z=1.130\pm0.074$ at $Y=1$.

31. An image processing control program according to claim 29, wherein the vision characteristics data is stored in a color table storing predetermined display colors and a color table storing display colors matching the visual situation of the simulated person.

32. An image processing control program stored in a computer readable storage medium for performing an image processing control for vision correction, the program comprising the steps of:

inputting an image to be used for the vision correction;

performing conversion of values of XYZ chromaticity coordinates in accordance with vision characteristics data of the XYZ chromaticity coordinates for a user and correcting the input image; and outputting a corrected image compensating a visual situation of the user in accordance with the corrected input image.

33. An image processing control program according to claim 32, the vision characteristics data is a proportional coefficient for each of values of XYZ chromaticity coordinates, and wherein a value of the proportional coefficient having a predetermined relation to a vision of a healthy youth, and wherein the value of the proportional coefficient is 1.00 to 2.25 times for X, 1.00 to 2.17 for Y and 1.00 to 2.41 times for Z, where $X=1.018\pm0.147$ and $Z=0.893\pm0.058$ at $Y=1$.

34. An image processing control program according to claim 32, wherein the vision characteristics data stored is stored in a color table storing predetermined display colors and a color table storing display colors compensating the visual situation of the user.

* * * * *

UNITED STATES PATENT AND TRADEMARK OFFICE
CERTIFICATE OF CORRECTION

PATENT NO. : 6,917,705 B2
APPLICATION NO. : 10/101971
DATED : July 12, 2005
INVENTOR(S) : Miho Sugiyama It is certified that error appears in the above-identified patent and that said Letters Patent is hereby corrected as shown below:

Title page,
Item [74], *Attorney, Agent, or Firm*, "Fitzpartick," should read -- Fitzpatrick, --.
Item [57], ABSTRACT,
Line 1, "visual disorder" should be deleted;
Line 2, "person" should read -- person with visual disorder --;
Line 3, "visual disorder person" should read -- person with visual disorder --; and
Line 6, "visual disorder persons" should read -- persons with visual disorders --.

Drawings,
Sheet 1, Fig. 1, "YOUTH" should read -- YOUNG --.
Sheet 2, Fig. 3, "TO CATARACT" should read -- OF AN ELDERLY CATARACT PATIENT -- and "PATIENT'S YOUNG MAN" should read -- RELATIVE TO A HEALTHY YOUTH --.

Column 1,
Line 14, "visual disorder person" should read -- person with visual disorder --;
Line 17, "an" should read -- a --;
Line 18, "elderly people" should be deleted and
"which" should read -- whose --;
Line 20, "there is" should read -- there are --;
Line 22, "to then" should read -- to them --;
Line 28, "A household" should read -- Household -- and
"a household" should read -- household --;
Line 29, "machine" should read -- machines --;
Line 33, "not easy" should read -- it is not easy --;
Line 38, "manhood," should read -- adulthood, --;
Line 39, "use of" should read -- use by -- and
"Works" should read -- Operation -- and "are" should read -- is --;
Line 45, "manhood." should read -- adulthood. --; and
Line 52, "visual disorder people" should read -- people with visual disorder --.

Column 2,
Lines 53 and 67, "making" should read -- makes --.

Column 3,
Line 32, "2.17" should read -- 2.17 times --; and
Line 45, "reproduction" should read -- reproducing --.

UNITED STATES PATENT AND TRADEMARK OFFICE
CERTIFICATE OF CORRECTION

PATENT NO. : 6,917,705 B2
APPLICATION NO. : 10/101971
DATED : July 12, 2005
INVENTOR(S) : Miho Sugiyama It is certified that error appears in the above-identified patent and that said Letters Patent is hereby corrected as shown below:

Column 4,
Linr 62, "hazy" should read -- haze --.

Column 5,
Line 1, "hazy" should read -- haze --.

Column 6,
Line 1, "2.17" should read -- 2.17 times --; and
Line 44, "This" should read -- These --.

Column 8,
Line 15, "results" should read -- result --;
Line 42, "2.17" should read -- 2.17 times --; and
Line 52, "This" should read -- These --.

Column 9,
Line 50, "assistants PDA)" should read -- assistant (PDA) --.

Column 10,
Lines 24 and 40, "manhood." should read -- adults. --;
Line 36, "prevail" should read -- provide --; and
Line 41, "works," should read -- work, --.

Column 11,
Lines 1 and 34, "2.17" should read -- 2.17 times --;
Line 10, "by ages," should read -- by age, --;
Line 44, "by ages," should read -- by age, --; and
Line 47, "visual disorder person" should read -- person with visual disorder --.

Column 12,
Line 3, "2.17" should read -- 2.17 times --;
Lines 12 and 41, "by ages," should read -- by age, --;
Line 32, "2.17" should read -- 2.17 times --;
Line 44, "visual disorder person" should read -- person with visual disorder --; and
Line 59, "making" should read -- makes --.

UNITED STATES PATENT AND TRADEMARK OFFICE
CERTIFICATE OF CORRECTION

PATENT NO.       : 6,917,705 B2
APPLICATION NO.  : 10/101971
DATED            : July 12, 2005
INVENTOR(S)      : Miho Sugiyama It is certified that error appears in the above-identified patent and that said Letters Patent is hereby corrected as shown below:

Column 13,
Lines 2 and 29, "2.17" should read -- 2.17 times --;
Line 19, "making" should read -- makes --.

Column 14,
Lines 7 and 33, "having" should read -- has --;
Line 9, "2.17" should read -- 2.17 times --;
Line 30, "32," should read -- 32, wherein --; and
Line 35, "2.17" should read -- 2.17 time --.

Signed and Sealed this

Twenty-fifth Day of July, 2006

JON W. DUDAS
*Director of the United States Patent and Trademark Office*